United States Patent
Wood

(10) Patent No.: US 10,574,628 B2
(45) Date of Patent: Feb. 25, 2020

(54) COMPUTER SECURITY SYSTEM AND METHOD BASED ON USER-INTENDED FINAL DESTINATION

(71) Applicant: Michael C. Wood, Wilton Manors, FL (US)

(72) Inventor: Michael C. Wood, Wilton Manors, FL (US)

( * ) Notice: Subject to any disclaimer, the term of this patent is extended or adjusted under 35 U.S.C. 154(b) by 0 days.

(21) Appl. No.: 16/508,252

(22) Filed: Jul. 10, 2019

(65) Prior Publication Data
US 2019/0334867 A1    Oct. 31, 2019

Related U.S. Application Data

(63) Continuation of application No. 16/264,579, filed on Jan. 31, 2019, which is a continuation of application No. 16/135,810, filed on Sep. 19, 2018, now Pat. No. 10,320,746, which is a continuation-in-part of application No. 16/116,386, filed on Aug. 29, 2018, which is a continuation-in-part of application No. 15/429,073, filed on Feb. 9, 2017, said application No. 16/135,810 is a continuation-in-part of application No. 15/845,597, filed on Dec. 18, 2017, now Pat. No. 10,348,682, which is a continuation of application No. 15/206,594, filed on Jul. 11, 2016, now Pat. No. 9,882,877, which is a continuation-in-part of application No. 14/706,459,
(Continued)

(51) Int. Cl.
*H04L 29/06* (2006.01)
*H04L 29/12* (2006.01)
*H04L 29/08* (2006.01)
*H04L 12/721* (2013.01)

(52) U.S. Cl.
CPC .......... *H04L 63/0227* (2013.01); *H04L 45/66* (2013.01); *H04L 61/1511* (2013.01); *H04L 61/2038* (2013.01); *H04L 61/2069* (2013.01); *H04L 61/6022* (2013.01); *H04L 63/0236* (2013.01); *H04L 63/101* (2013.01); *H04L 63/1408* (2013.01); *H04L 67/12* (2013.01); *H04L 63/168* (2013.01); *H04L 67/02* (2013.01)

(58) Field of Classification Search
CPC ............. H04L 63/0227; H04L 63/0236; H04L 63/101; H04L 63/1408; H04L 63/168; H04L 45/66; H04L 61/1511; H04L 61/2038; H04L 61/2069; H04L 61/6022; H04L 67/12; H04L 67/02
See application file for complete search history.

(56) References Cited

U.S. PATENT DOCUMENTS 5,629,930 A * 5/1997 Beshai .................... H04L 45/00
                                                       370/396
7,130,262 B1 * 10/2006 Cortez .................. H04J 3/1617
                                                       370/216
(Continued)

*Primary Examiner* — Sarah Su
(74) *Attorney, Agent, or Firm* — Johnson & Martin, P.A.; James David Johnson

(57) ABSTRACT

A system and method is described for protecting applications against malicious URL links by identifying a final destination. The system and method also includes enabling a user process to directly connect to the final destination, bypassing the original URL altogether; thereby bypassing the hacker's ability to use that URL to programmatically send the application to a malicious site.

12 Claims, 4 Drawing Sheets

Related U.S. Application Data filed on May 7, 2015, now Pat. No. 9,467,324, said application No. 16/135,810 is a continuation-in-part of application No. 15/429,073, filed on Feb. 9, 2017.

(60) Provisional application No. 62/757,449, filed on Nov. 8, 2018, provisional application No. 62/552,238, filed on Aug. 30, 2017, provisional application No. 62/439,778, filed on Dec. 28, 2016, provisional application No. 62/395,021, filed on Sep. 15, 2016, provisional application No. 62/354,588, filed on Jun. 24, 2016, provisional application No. 62/350,556, filed on Jun. 15, 2016, provisional application No. 62/348,518, filed on Jun. 10, 2016, provisional application No. 62/328,912, filed on Apr. 28, 2016, provisional application No. 62/314,225, filed on Mar. 28, 2016, provisional application No. 62/295,315, filed on Feb. 15, 2016, provisional application No. 62/717,467, filed on Aug. 10, 2018, provisional application No. 62/682,576, filed on Jun. 8, 2018, provisional application No. 62/211,379, filed on Aug. 28, 2015, provisional application No. 62/192,365, filed on Jul. 14, 2015, provisional application No. 61/991,828, filed on May 12, 2014, provisional application No. 62/587,975, filed on Nov. 17, 2017, provisional application No. 62/579,875, filed on Oct. 31, 2017.

(56) References Cited

U.S. PATENT DOCUMENTS

| | | | | |
|---|---|---|---|---|
| 8,645,300 | B1 * | 2/2014 | Cowdrey | G06F 16/95 706/46 |
| 9,094,443 | B1 * | 7/2015 | Martini | G06F 16/9566 |
| 9,137,143 | B2 * | 9/2015 | Parker | H04L 45/04 |
| 9,268,956 | B2 * | 2/2016 | Anakata | G06F 21/604 |
| 9,282,037 | B2 * | 3/2016 | Parker | H04L 45/10 |
| 10,320,746 | B2 * | 6/2019 | Wood | H04L 63/1408 |
| 2002/0073058 | A1 * | 6/2002 | Kremer | G06Q 30/02 |
| 2008/0034073 | A1 * | 2/2008 | McCloy | H04L 63/0236 709/223 |
| 2008/0250159 | A1 * | 10/2008 | Wang | G06F 21/6218 709/239 |
| 2011/0030058 | A1 * | 2/2011 | Ben-Itzhak | G06F 21/51 726/24 |
| 2011/0145435 | A1 * | 6/2011 | Bhatawdekar | G06F 21/566 709/238 |
| 2012/0102545 | A1 * | 4/2012 | Carter, III | G06F 21/51 726/3 |
| 2014/0289597 | A1 * | 9/2014 | Kim | G06F 16/957 715/205 |
| 2015/0163236 | A1 * | 6/2015 | Niemela | H04L 63/1425 726/23 |
| 2016/0119344 | A1 * | 4/2016 | Freitas Fortuna dos Santos | H04L 63/1466 726/7 |

\* cited by examiner

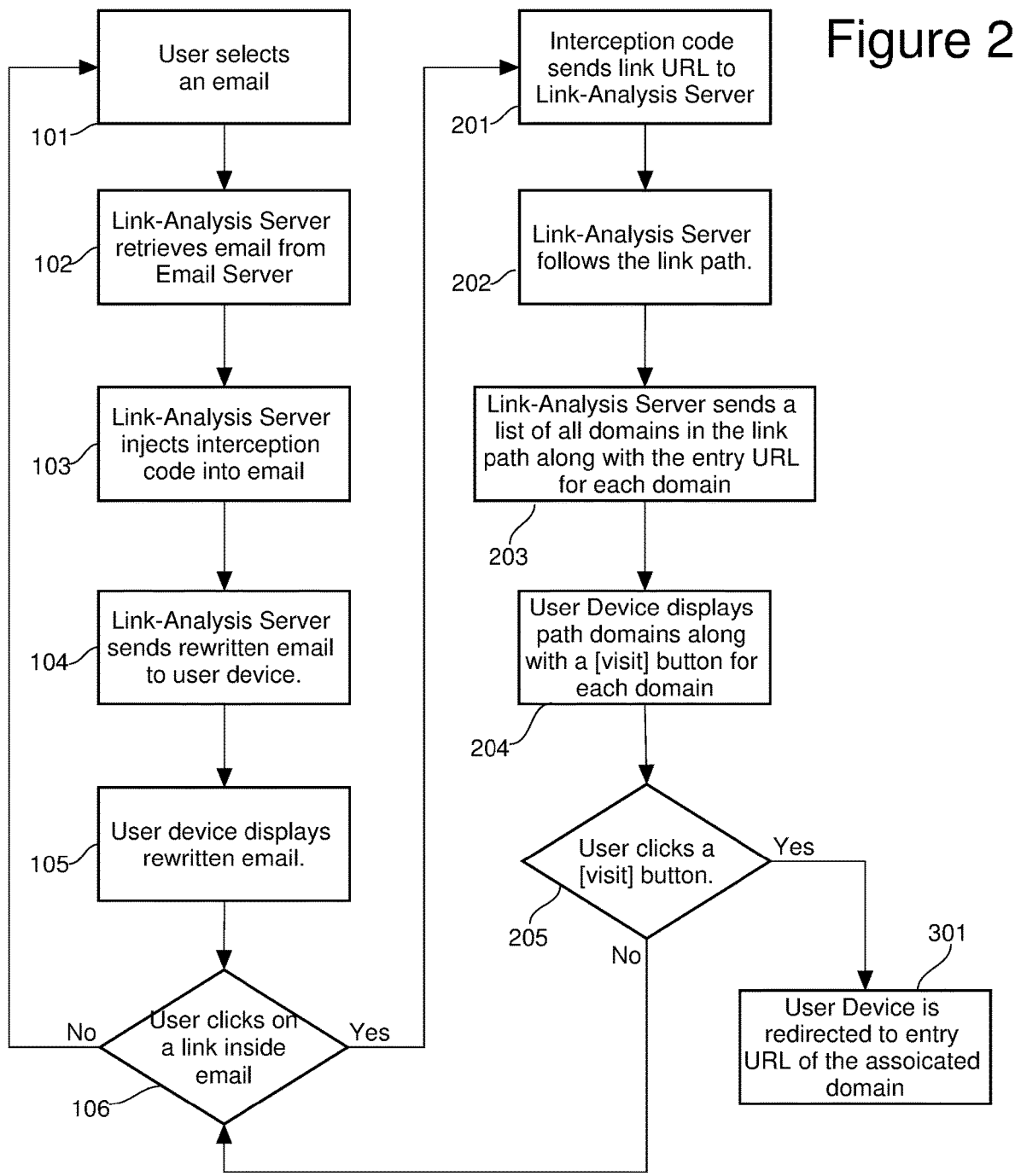

Figure 3 http://app.bronto.com/t/l?ssid=34628&subscriber_id=atmtgldkujgnncnttniwjffqhaxbbha&delivery_id=bhrjsqhmftwulbpibjltcwrgkvysbpi&td= http://li.dailysale.com/click?s=151377&sz=300x250&li=6SKUWT2B&e=estebangato70@yahoo.com&p=65zhu5efg40bo1iiy2b5su6bna0au& http://p.liadm.com/click?s=151377&sz=300x250&li=6SKUWT2B&m=f29ca7a15227af8f6803fb9cfd9b00b2&sh=357198b22663767131594a http://www.birchlane.com/gateway.php?&url=https%3A%2F%2Fwww.birchlane.com%2F&refid=LVNTBL1.OL573&image=46537538&cid

Figure 4
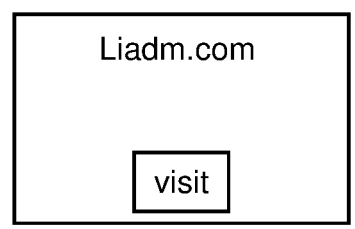

COMPUTER SECURITY SYSTEM AND METHOD BASED ON USER-INTENDED FINAL DESTINATION

CROSS-REFERENCE TO RELATED APPLICATIONS

This application claims priority from and is a continuation of: U.S. nonprovisional patent application Ser. No. 16/264,579 filed on Jan. 31, 2019, which is: (a) a nonprovisional of and claims priority from U.S. provisional patent application Ser. No. 62/757,449 filed on Nov. 8, 2018; and (b) a continuation of U.S. nonprovisional patent application Ser. No. 16/135,810 filed on Sep. 19, 2018 (now issued U.S. Pat. No. 10,320,746), which is: (i) a continuation-in-part of U.S. nonprovisional patent application Ser. No. 16/116,386 filed on Aug. 29, 2018, which is: (1) a nonprovisional of and claims priority from U.S. provisional patent application Ser. No. 62/552,238 filed on Aug. 30, 2017, and (2) a continuation-in-part of U.S. nonprovisional patent application Ser. No. 15/429,073 filed on Feb. 9, 2017, which is a nonprovisional of and claims priority from the following: U.S. provisional patent application Ser. No. 62/439,778 filed on Dec. 28, 2016, U.S. provisional patent application Ser. No. 62/395,021 filed on Sep. 15, 2016, U.S. provisional patent application Ser. No. 62/354,588 filed on Jun. 24, 2016, U.S. provisional patent application Ser. No. 62/350,556 filed on Jun. 15, 2016, U.S. provisional patent application Ser. No. 62/348,518 filed on Jun. 10, 2016, U.S. provisional patent application Ser. No. 62/328,912 filed on Apr. 28, 2016, U.S. provisional patent application Ser. No. 62/314,225 filed on Mar. 28, 2016, and U.S. provisional patent application Ser. No. 62/295,315 filed on Feb. 15, 2016; (ii) a nonprovisional of and claims priority from U.S. provisional patent application Ser. No. 62/717,467 filed on Aug. 10, 2018; (iii) a nonprovisional application of and claims priority from U.S. provisional patent application Ser. No. 62/682,576 filed on Jun. 8, 2018; (iv) a continuation-in-part of U.S. nonprovisional patent application Ser. No. 15/845,597 filed on Dec. 18, 2017 (now issued U.S. Pat. No. 10,348,682), which is a continuation of U.S. nonprovisional patent application Ser. No. 15/206,594 filed on Jul. 11, 2016 (now issued U.S. Pat. No. 9,882,877), which is: (1) a nonprovisional application of and claims priority from U.S. provisional patent application Ser. No. 62/211,379 filed on Aug. 28, 2015 and U.S. provisional patent application Ser. No. 62/192,365 filed on Jul. 14, 2015, and (2) a continuation-in-part of U.S. nonprovisional patent application Ser. No. 14/706,459 filed on May 7, 2015 (now issued U.S. Pat. No. 9,467,324), which is a nonprovisional of and claims priority from U.S. provisional patent application Ser. No. 61/991,828 filed on May 12, 2014; (v) a nonprovisional of and claims priority from U.S. provisional patent application Ser. No. 62/587,975 filed on Nov. 17, 2017; (vi) a nonprovisional of and claims priority from U.S. provisional patent application Ser. No. 62/579,875 filed on Oct. 31, 2017; and (vii) a continuation-in-part of U.S. nonprovisional patent application Ser. No. 15/429,073 filed on Feb. 9, 2017, which is a nonprovisional application of and claims priority from the following: U.S. provisional patent application Ser. No. 62/439,778 filed on Dec. 28, 2016, U.S. provisional patent application Ser. No. 62/395,021 filed on Sep. 15, 2016, U.S. provisional patent application Ser. No. 62/354,588 filed on Jun. 24, 2016, U.S. provisional patent application Ser. No. 62/350,556 filed on Jun. 15, 2016, U.S. provisional patent application Ser. No. 62/348,518 filed on Jun. 10, 2016, U.S. provisional patent application Ser. No. 62/328,912 filed on Apr. 28, 2016, U.S. provisional patent application Ser. No. 62/314,225 filed on Mar. 28, 2016, and U.S. provisional patent application Ser. No. 62/295,315 filed on Feb. 15, 2016.

All of the foregoing applications and issued patents and U.S. nonprovisional patent application Ser. No. 15/452,481 filed on Mar. 7, 2017 (now issued U.S. Pat. No. 9,992,233) are incorporated by reference herein in their entireties.

FIELD OF THE INVENTION

The invention relates to computer security and systems and methods for preventing hacking attacks. More particularly, the invention relates to systems and methods for identifying a final destination site to allow a user process to directly connect to the final destination; bypassing at least the original URL.

BACKGROUND

The term "phishing" was first coined in 1996. Sophisticated, well-organized phishing campaigns began in earnest in 2003 specifically targeting PayPal users. Phishing links quickly grew to become the number one successful hacking attack. Even to this day, phishing links have continued to be the number one successful hacking attack. Despite state-of-the-art measures by those skilled in the art, solving the problem of phishing links remains a long sought, deeply-felt need.

Phishing links trick users into visiting malicious websites, which then mimic well-known sites (e.g., banking websites) or instantly install malware on the user's computer. Via the installed malware, the hacker can then capture all keystrokes and more, gaining login credentials and a host of other compromising information.

The number of successful hacking attacks via malicious websites continues to escalate despite widespread use of state-of-the-art security measures. In providing protection against visiting malicious sites, current systems and methods generally offer three security measures:

(i) Blacklists are used to prevent users from visiting known malicious sites.

(ii) Email clients show the sender of the email; and browsers display the URL of each link when the cursor is hovering over the link.

(iii) Links are scanned in real time to determine whether they contain any malicious code and whether they redirect to other sites serving malicious code.

Hackers have adopted methodologies that routinely defeat all three security measures above. For example, a study conducted by Webroot revealed an average of 1.4 million unique phishing websites are created every month, with the majority only online for between four and eight hours. Most of these phishing websites pretend to be high-profile technology and banking firms. This technique keeps the first security method (blacklists) continually out of date, and therefore, ineffective.

Spear phishing attacks involve imitating trusted senders. For example, out of the 537,617 spear phishing attacks analyzed by Great Horn: 490,557 used faked display names, 44,726 altered the email's header contents (including the "from" field and other fields), and 2,337 used domain names that looked like trusted domains. These commonly employed tactics actually use the display of sender name against the user. Ironically, the second security method above (sender display) can be used to actually encourage users to trust the spear phishing email. This makes the security method not only ineffective, but even harmful.

The inherent weaknesses of the first two methods led to the current state-of-the-art security method: link scanning. Unfortunately, link scanning solely provides the illusion of security while being trivial for hackers to circumvent. Hackers circumvent link scanning in a simple, straightforward manner: when a security service accesses the link, the hacker's server sends the security service to a clean site; but when a victim's computer accesses the very same link, the server sends the victim to a malicious site. Links are dynamic, not static. Links are easily programmed to have different behaviors for different IP addresses. Therefore, security services are scanning behaviors that are different from the ones that victims will encounter. Thus, the security service renders the link "good"; the user trusts the "good" rating, and then proceeds to get hacked.

Since link scanning is currently in vogue among those skilled in the art, it is worthwhile to explore how easily this security is circumvented. If a security service uses the same IP address to scan links (or the same group of IP addresses) then hackers simply program the links to exhibit good behavior whenever one of those IP addresses is encountered. If a security service uses proxied IP addresses, then the hacker simply needs to send two emails (instead of one) to complete the attack. After all, the security service will have two different IP addresses for the two emails while the victim will likely have one common IP address when opening the two emails. Hence, the second email can then send the common IP address (the victim's IP address) to a malicious site; thereby completing the attack.

In an attempt to overcome the above, link scanning can be implemented on the client device itself. However, this also presents its own problems. First, this method inherently provides the user's IP address to hackers (perhaps for emails that the user might not even click on). Secondly, hackers easily insert simple behavioral tests to determine whether the link is being scanned or actually being accessed by a user. For example, link scanners running on a client device normally would not execute arbitrary code on that device (otherwise that would be a huge security hole). Therefore, the hacker's server simply includes arbitrary test code in the first returned link. If the code is not executed, then the link subsequently redirects to a clean site. But if the test code is executed (i.e., when the user accesses the link) then the link subsequently redirects to a malicious site.

The creative variability of link behavior is demonstrated by the recent 2018 attacks on US government officials. As reported by The Daily Beast: "The attempt against McCaskill's office [in 2018] was a variant of the password-stealing technique used by Russia's so-called 'Fancy Bear' hackers against Clinton's campaign chairman, John Podesta, in 2016."

"The hackers sent forged notification emails to Senate targets claiming the target's Microsoft Exchange password had expired, and instructing them to change it. If the target clicked on the link, he or she was taken to a convincing replica of the U.S. Senate's Active Directory Federation Services (ADFS) login page, a single sign-on point for e-mail and other services."

"As with the Podesta phishing, each Senate phishing email had a different link coded with the recipient's email address." (www.thedailybeast.com/russian-hackers-new-target-a-vulnerable-democratic-senator, bracket annotation added)

Encoding the recipient's email address within the link empowers the hacker's server to customize the link behavior based on the recipient. Furthermore, if the hacker has a database matching email addresses to IP addresses (a trivial database to build automatically) then the hacker can send victims to a malicious site (via their IP addresses), while sending government security scanners to a clean site (since the security scanner IP addresses will not match the IP address corresponding to the email).

The bottom line is that links are dynamic. Link behavior is entirely up to the creativity of the hacker. Hence there is literally an infinite, unlimited number of ways in which any given link can behave. This has, until now, provided hackers with a seemingly insurmountable advantage. This has, until now, seemed to be an intractable problem for those skilled in the art.

SUMMARY

The invention disclosed herein describes an elegant solution to the problem of phishing links that has vexed those skilled in the art for decades. The invention disclosed herein is a creative, outside-the-box solution; achieved by approaching the problem from a novel perspective.

Client-side devices communicate with websites and web-app servers via the HTTP(S) communication protocol. Link redirects have been an integral part of this protocol since its inception more than two decades ago. The key to solving the problem is to creatively step outside the presumed rules, and reimagine a new paradigm in which these attacks are not even possible to succeed. The outside-of-the-box paradigm removes link redirect following from client apps; thereby sidestepping the problem altogether.

This present invention changes the whole way in which internet communication flows, while preserving the benefits of link redirection in the process (by relegating them to segregated final-destination determination processes).

Traditional internet communication already includes both security-level processes ("security processes") and user-level processes ("user processes"). In traditional communication, the security processes would follow link redirects; scan all links within the path for malware; and then allow the user process to connect to the original link if all the security tests have been passed. For example, consider an email with a clickable link. The user process aims to connect the user's device to the link's URL when the user clicks on the link. The security process would either allow or block this connection based on the security analysis. In this way, provided the security service permits, user processes themselves ultimately follow the link redirects.

Here is the epiphany: the very problem of traditional internet communication is that user processes are following redirects. (After all, this is the very event that hackers exploit.) This led to another epiphany: if you can take away this event then you fully take away the hacker's ability to exploit. This is indeed a radical notion given that many (if not most) email clicks involve link redirects, and most of these redirects lead to still other redirects. In other words, the vast majority of connection traffic generated by email clicks involves user processes following redirects. Therefore, the invention disclosed herein proposes to alter the way the vast majority of connection traffic flows from user-selected links in emails, SMS apps, messaging apps, social media apps, etc. Hence, it is a creative, outside-of-the-box solution, albeit elegant.

The first embodiment implemented involved the following: an app with a user-selectable link; a final-destination determination process ("FDDP"); a display; a user process for connecting the app to a remote destination; where the FDDP finds the final destination of the link's URL redirect path upon user selection of the link; the display shows the final destination along with a choice of whether to connect or not; if the user chooses to connect then the user app connects directly to the final destination, bypassing all other URLs in the redirect path. In this manner, in stark contrast to traditional internet communication, the user process connects directly to the final destination (instead of connecting to the original URL link).

This first embodiment put hackers in an inescapable catch-22. If the hacker sends the FDDP down a clean path (to the desired final destination) then the user process will go straight to the clean destination—fully bypassing the hacker's ability to send the user process to a malicious site. But if the hacker's server sends the FDDP to a malicious destination then the user can see that the final destination does not match the expectation set by the email content; therefore, the user simply chooses not to connect.

Perhaps this embodiment is best explained by way of example. Let's say that a hacker sends an email claiming to be a security alert from Bank of America. Let's further say that the user trusts the email and clicks on the link, and the hacker's server sends the final-destination determination process (FDDP) down a redirect path that ends with bankofamerica.com. (However, the hacker's intention is to send the user process to a malicious site when it accesses the original link.) In the first embodiment, the user will be presented "bankofamerica.com" as the final destination (in this example). If the user chooses to connect, the user process connects directly to bankofamerica.com (not the original URL). Therefore, the hacker cannot send the user process down a different path because the user process never attempts to access the original link.

Meanwhile, if the hacker's server sends the FDDP to a final site other than bankofamerica.com then the user can see that the final destination is not the one expected and therefore choose simply not to connect. Regardless of where the hacker sends the FDDP, the user process (and thereby the user) remains safely out of the hacker's control.

It is not uncommon for websites to have landing URLs which redirect to other URLs within the same domain ("intra-domain redirects"). In this present paradigm, these can be treated distinctly from redirects that go to different domains ("trans-domain redirects"). For example, a redirect from http://bankofamerica.com to https://bankofamerica.com is an intra-domain redirect; whereas a redirect from http://example.com to http://bankofamerica.com is a trans-domain redirect. Thus, in some embodiments, the final destination can be the first URL of the final domain, and intra-domain redirects can be safely accepted and followed.

For example, let's say that a malicious email imitating Bank of America includes a series of redirects that ultimately cross three domains in the following order: example.com→keylogger-install.com→bankofamerica.com. (The hacker's intention is to install a key logger before connecting the user to Bank of America). Let's further say that the final domain has the following intra-domain redirects: https://bankofamerica.com/landing-page.php/user=xyz→https://bankofamerica.com/userInfo/index.php. In this example, let's say that going straight to the last URL causes an error (because the website is expecting traffic to come from the landing page). The second embodiment can be implemented where such occurrences are possible. In the second embodiment, the final destination is the first URL of the last domain. In other words, the final destination is the Bank of America's landing page. And since intra-domain redirects are allowed in the second embodiment, the landing page will take the user safely to the final URL.

As with traditional security, the FDDP can be implemented on the server, the client device, both, or even integrated into client apps themselves. While client-side implementations will indeed expose the user's IP address, they do not suffer the far more major problem encountered by traditional client-side link scanning. As noted above, traditional client-side link scanning still has the user process connect to the initial link in the path (opening the door for the hacker to programmatically send the user process down a different path). In stark contrast, in this present invention, even if client-side FDDP implementations are used, the user process is directly connected to the final destination; thereby bypassing the hacker's ability to send the user process down a malicious path. Thus, high security can be achieved with the FDDP being implemented on the server, the client, an intervening device such as a router, etc. The location of the FDDP does not impact the ultimate result of sending the user process directly to the final destination. Hence, the FDDP can be executed from any location, or even have components of itself executed from multiple locations. Any implementation in which one or more FDDPs enable one or more user processes to connect directly to the final destination is within the spirit and scope of this invention. This includes, but is not limited to, embodiments where the FDDP is integrated into the same app as the user process. In a similar manner, the steps of the FDDP and the step of connecting to the final destination can be accomplished in a single process as well. In other words, the FDDP process and the user process can be merged together into a single process (or can be considered components of a single larger process). Any embodiment in which a final destination is determined to enable an app to connect to that final destination in lieu of the original link URL falls within the spirit and scope of this invention.

Enabling users to match final destinations to expected outcomes offers unparalleled security when such users are knowledgeable and technically savvy. In other environments, other embodiments may be chosen. For example, the user process may automatically connect to the final destination if the security service deems the final destination itself to be safe. This, in stark contrast to the traditional model, still bypasses the hacker's ability to programmatically send the user process down a different path. And since such embodiments still involve an FDDP enabling a user process to go to the final destination, such embodiments fall within the spirit and scope of this invention.

It also bears noting that final destination can be computed in various ways. Two ways have been discussed so far: the ultimate URL, or the first URL of the final domain. Yet another calculation can be based on Domain Groups. It is not too uncommon for a legitimate, expected domain to redirect to an outside email tracking service which then redirects back to a different URL on the expected domain. In this example, there are a series of intra-domain and trans-domain redirects: intra-domain redirects on the expected domain; followed by a trans-domain redirect to the external email tracking service; followed by intra-domain redirects on the email tracking service; followed by a trans-domain redirect to yet another URL on the expected domain; followed by intra-domain redirects on the expected domain. In this present invention, we will refer to each trans-domain redirect as demarking a new Domain Group. Hence, in this example, there are three Domain Groups: expected domain URLs (Domain Group 1), marketing service URLs (Domain Group 2), and expected domain other URLs (Domain Group 3). When calculating the final destination, using the first URL of the last domain would result in the entry URL of Domain Group 1 (in this example). This may not be the desired result for embodiments that wish to layer privacy with phishing protection. Hence, privacy-centric embodiments may choose to calculate the final destination as the first URL of the last Domain Group. In such a determination, the first URL of Domain Group 3 would be the final destination. This determination would thereby allow the user process to not only bypass the hacker's ability to redirect it down a malicious path, but it also bypasses the ability of the email marketing service to track the user's activity as well.

In light of the above, any implementation which allows one or more user processes to bypass one or more URLs of the original link path falls within the spirit and scope of this invention. This includes redirecting users to other URLs not included in the original link path. Any embodiment in which one or more URLs in the original link path are bypassed by one or more user processes is included in the spirit and scope of this invention.

This system and method can be used to secure any app containing a user-selectable link that results in the device connecting to a remote location. Hence, various embodiments can be used to secure:

URL links in emails.
URL links in webpages.
URL addresses entered into browsers.
URL addresses in chat, text, and messaging apps.
URL addresses in social media apps.
URL addresses in any web app.
URL addresses in any client-side app.

Various embodiments can secure any one of the above, any combination of the above, and/or all of the above.

Accordingly, the invention features a system for protecting applications and computing devices against malicious URL links. The system includes a computing device having a processor and an associated memory, a software application running on the computing device and including a link, a communications network, a final destination determination process, and a user process for connecting the software application to a remote destination. The computing device is communicatively connected to the communications network. The final destination determination process identifies a final destination of the link, and the user process connects to the final destination.

In another aspect, the invention can feature the final destination not being an original URL of the link.

In another aspect, the invention can feature the computing device automatically transmitting the link to the final destination determination process.

In another aspect, the invention can feature the final destination determination process being installed on a second computing device.

In another aspect, the invention can feature the user process connecting directly to the final destination if the user selects a connect option.

In another aspect, the invention can feature the software application being or including a web browser, an e-mail application, a text message application, an instant message application, a chat application, a web application, a client-side application, a social media application, or any other software application capable of displaying a link that is selectable to connect to the remote destination.

In another aspect, the invention can feature the system further including a display communicatively connected to the computing device, wherein the display shows the final destination.

In another aspect, the invention can feature the final destination determination process and the user process being merged together into a single process.

In another aspect, the invention can feature the display showing a connect option, wherein the user process connects to the final destination when the connect option is selected and does not connect to the final destination if the connect option is not selected.

In another aspect, the invention can feature the computing device or a device that is connected to the computing device providing an audible or visual representation of the final destination, wherein the representation is or includes at least one of a hyperlink, a URL, a domain name, or a name of an owner of the final destination.

In another aspect, the invention can feature the link being automatically transmitted to the final destination determination process before being displayed on a display that is communicatively connected to the computing device.

In another aspect, the invention can feature the computing device transmitting the link to the final destination determination process when the user selects the link using a user input device, wherein the final destination determination process is remotely located from the computing device.

In another aspect, the invention can feature the user process bypassing connections to all other remote destinations in a path associated with the link when the user process directly connects to the final destination.

In another aspect, the invention can feature the final destination determination process transmitting the final destination of the link to the computing device.

In another aspect, the invention can feature the computing device providing a connect option that may be toggled between: (i) a user-selectable instruction to follow a path to connect from the link to the final destination, wherein the path includes one or more sites between the link and the final destination, or (ii) a user-selectable instruction to connect directly to the final destination without following the path.

The invention also features a system for protecting applications and computing devices against malicious URL links. The system includes a computing device having a processor and an associated memory, a software application running on the computing device and including a link, a display communicatively connected to the computing device, a user input device communicatively connected to the computing device, a communications network, a final destination determination process, and a user process for connecting the software application to a remote destination via the communications network. The computing device is communicatively connected to the communications network. The final destination determination process identifies a final destination, and the final destination of the link is shown on the display upon selection of the link. A user makes a user selection using the user input device to produce an instruction to connect to the final destination or declines to connect to the final destination based on the final destination shown by the display. The computing device allows or disallows a connection to the final destination based on the instruction. Disallowing the connection to the final destination may mean blocking the connection based on receiving a user instruction to block or declining to connect if no user instruction is received.

In another aspect, the invention can feature the final destination not being the original URL of the link.

In another aspect, the invention can feature the computing device automatically transmitting the link to the final destination determination process.

In another aspect, the invention can feature the final destination determination process being installed on a second computing device.

In another aspect, the invention can feature the user process being installed on the computing device and connecting directly to the final destination if the user selects a connect option.

In another aspect, the invention can feature the software application being or including a web browser, an e-mail application, a text message application, an instant message application, a chat application, a web application, a client-side application, a social media application, or any other software application capable of displaying a link that is selectable to connect to the remote destination.

In another aspect, the invention can feature the display showing a connect option, wherein the user process connects to the final destination when the connect option is selected and does not connect to the final destination if the connect option is not selected.

In another aspect, the invention can feature the display showing a connect option or a block option, wherein the user process connects to the final destination when the connect option is selected and blocks connection to the final destination if the block option is selected.

In another aspect, the invention can feature the display providing a representation of the final destination, wherein the representation is or includes at least one of a hyperlink, a URL, a domain name, or a name of an owner of the final destination.

In another aspect, the invention can feature the link being automatically transmitted to the final destination determination process before being displayed on the display.

In another aspect, the invention can feature the computing device transmitting the link to the final destination determination process when the user selects the link using the user input device.

In another aspect, the invention can feature the user process bypassing connections to all other remote destinations in a path associated with the link when the user process directly connects to the final destination.

In another aspect, the invention can feature the final destination determination process transmitting the final destination of the link to the computing device.

In another aspect, the invention can feature the computing device providing a connect option that may be toggled between: (i) a user-selectable instruction to follow a path to connect from the link to the final destination, wherein the path includes one or more sites between the link and the final destination, or (ii) a user-selectable instruction to connect directly to the final destination without following the path.

The invention also features a method for protecting applications and computing devices against malicious URL links. The method includes the step of: (a) protecting a software application and a computing device against malicious URL links using a system that includes: (i) the computing device, which has a processor and an associated memory; (ii) the software application, which runs on the computing device and includes a link; (iii) a communications network; (iv) a final destination determination process; and (v) a user process for connecting the software application to a remote destination. The computing device is communicatively connected to the communications network. The method further includes the steps of: (b) using the final destination determination process, identifying a final destination of the link; and (c) using the user process, connecting to the final destination.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 2 is a flow chart showing one embodiment based on the configuration of FIG. 1, in which the user selects an email to read, this email-read request is sent to the server, and the server retrieves the email from the email server.

FIG. 3 shows an example of a URL chain that a link having a URL, other links in a chain of links (formally known as "link redirection," wherein each link in the chain of links includes a URL), and a final destination having a URL.

FIG. 4 shows an example "visit" buttons or icons displayed on a display by the computing device, wherein the "visit" buttons or icons are generated from the URLs in FIG. 3.

DETAILED DESCRIPTION

Figure 1:
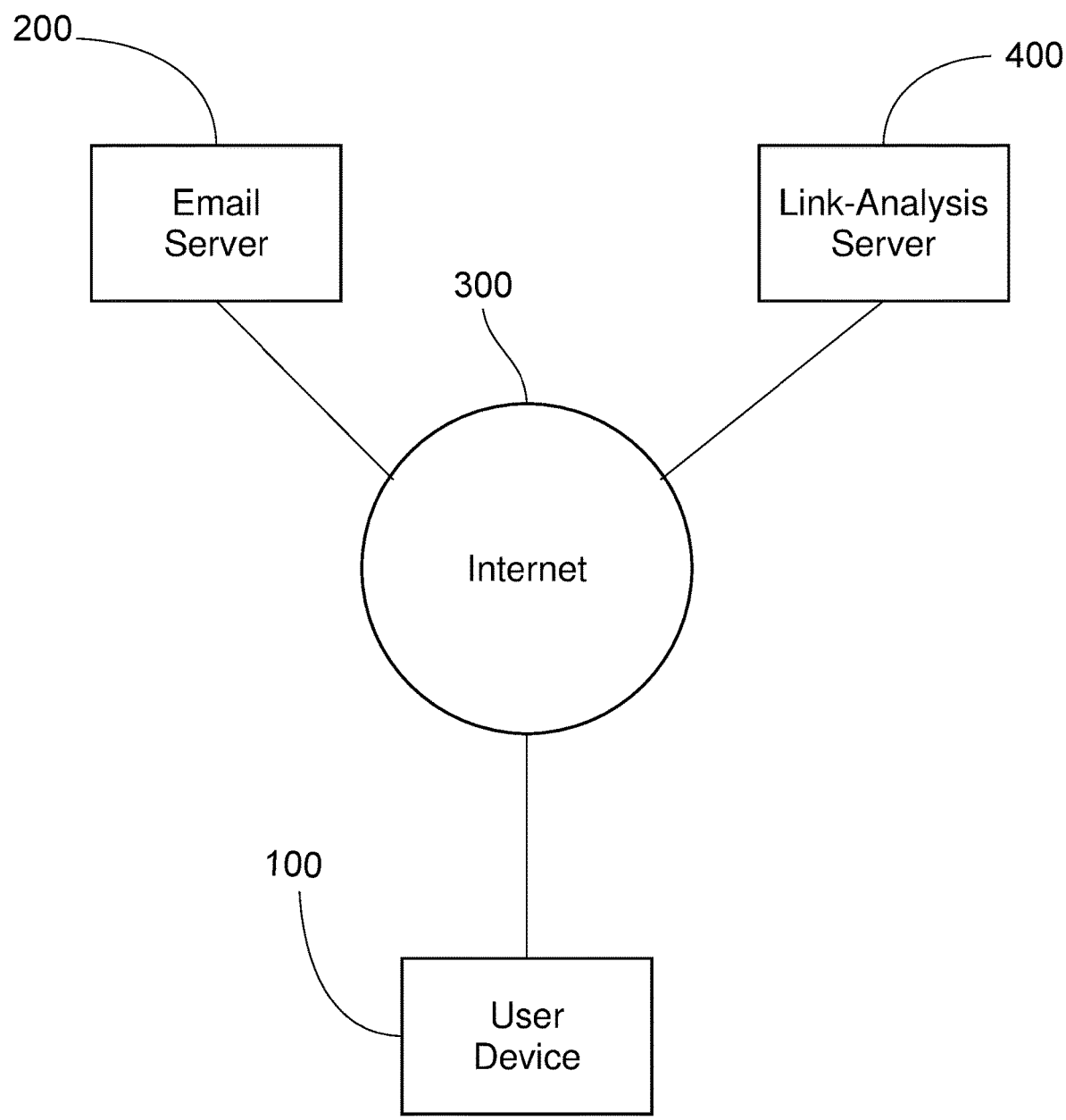
FIG. 1 is a diagram showing one embodiment in which a user device is accessing email via an Internet web app that resides on a link analysis server.

One sample embodiment is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides computer security systems and methods for protecting applications against malicious URL links by utilizing a user-intended final destination to prevent phishing attacks by hackers.

As used herein, a "link" can be a hyperlink (e.g., the type displayed on a webpage, in an email, or in a messaging app, a domain name, a URL, or a domain name owner's name. The link can be text, an image, a video, or any other item represented on the display that is capable of selection on the computing device to follow the link so that a connection is made to a remote site. The link points to a remote site that the user may access or connect to by selecting the link. The link may be selected using a user input device to click on the link, hover over the link, touch the link, tap on the link, or select it by voice or other selection means.

The computing device is a computer (e.g., a desktop computer or a lap top computer), a tablet computer, a cellular telephone (e.g., a smart phone), a personal digital assistant, a television (e.g., a smart television), a gaming device, a router, a server, a printer, a camera, or any other computing device having a processor and an associated memory and being capable of communicatively connecting to a communications network. The second computing device is also a device selected from among any of the foregoing devices.

For convenience, in some instances, the communications network is referred to herein as the Internet; however, in some embodiments, the communications network can be a different type of network, e.g., a local area network (LAN), a wide area network (WAN), or a virtual private network (VPN). The communications network can include one or more of the types of networks identified above, including multiple instances of a type of network and combinations of one or more types of networks. The communications network can be wired, wireless, or a combination of wired and wireless networks.

In embodiments containing a display, the display is a computer monitor or display screen. The display is communicatively connected to the computing device and can be an integral part of the computing device or a separate device that includes a wired connection or a wireless connection to the computing device.

In embodiments containing a user input device, the user input device can be a mouse, a trackball, a touch pad, or a touch screen. The system's display can be a touch screen. In other embodiments, the system can include both a display and a separate touch screen device. In some embodiments, the user input device is a microphone communicatively connected to a computing device that includes software for receiving a voice command to select a link shown on the display. In one embodiment, the user input device used to select the link is a brain-computer interface. In other embodiments, the user input device can be a pointing device, keyboard, joystick, gamepad, jog, dial, camera, button, switch, controller, or voice command device. The user input device is communicatively connected to the computing device and can be an integral part of the computing device or a separate device that includes a wired connection or a wireless connection to the computing device.

In embodiments containing a server, the server can be remote from the location of the computing device or in the same location as the computing device. The server may include an analysis engine, which is software for determining the final destination of the original link appearing in the content. The server may also include software for making a safety determination for each link transmitted to the server by a computing device for examination. The software for making the safety determination analyzes the link and determines whether the final destination is a safe site that does not include malicious code, which would receive a safe site determination, or a malicious site that does include malicious code, which would receive a malicious site determination. In some embodiments, the analysis engine is or includes the software for making the safety determination. In other embodiments, the analysis engine and the software for making the safety determination are separate, distinct software applications. In such latter embodiments, the analysis engine may analyze the link before, after, or concurrently with the examination made by the software for making the safety determination.

The term "content," as used herein, includes emails, text messages (e.g., SMS and MMS messages), chat messages, instant messages, and social media application and website posts and messages. "Content" can also include a webpage or document in which a link appears, e.g., a link appearing on a webpage of a website or a hyperlink appearing in a document (e.g., in a Word or PDF document). The examples of "content" described herein may only contain a single link that must be transmitted for analysis, or the content may contain more than one link.

Although the systems and methods described herein may be used with messaging applications (or "apps"), they may also be used to identify final destinations to allow or block any app on any computing device attempting to connect to remote sites.

FIG. 1 shows one embodiment in which a user's computing device 100 is accessing email from an email server 200 via an Internet web app 300 that resides on a link analysis server 400.

FIG. 2 shows one embodiment based on the configuration of FIG. 1, in which the user selects an email 101 to read. This email-read request is sent to the link analysis server, and the link analysis server retrieves the email from the email server 102. The link analysis server then rewrites the email by injecting link interception code into it 103 (so that the user's link selection does not automatically connect to the original URL). The link analysis server then sends the rewritten email to the computing device 104, whereupon a display communicatively connected to the computing device displays the rewritten email 105. The user might not click on any link in the email 106, in which case the user might simply select another email to read 101; or the user might click on a link in the email 106, in which case the link interception code sends the URL of the link to the link analysis server 201.

The link analysis server follows the link path from one URL to another 202. FIG. 3 shows partial URLs of a real world example when a user currently clicks on an ad to "visit Birch Lane" department store.

The link analysis server sends to the computing device the names of all domains in the path (also called "redirect links" or "link redirections") along with the entry URL of each domain 203, whereupon the computing device displays (on the display to which it is communicatively connected) the path domains along with a "visit" button or icon for each domain 204. The button or icon is referred to as a "visit" button or icon, but other language may also be used, e.g., a "connect" or "allow" button or icon. By selecting the "visit" button the computing device is connected to the final destination. FIG. 4 shows an example of such a display generated from the URLs in FIG. 3.

The user might choose to not visit any of the domains 205; in which case the user might click on another link in the email 106, or even select another email to read 101.

If the user does click on a [visit] button 205 then the user device is directly connected to the entry URL of the selected domain 301.

FIG. 3 shows a real world example of a URL chain that existed on Apr. 26, 2018. When a user clicks on a link with the first URL, the user is automatically taken to all the other links in the chain. This chaining of links is formally known as "link redirection."

Methodologies for following link redirects are well known in the art. However, the following is novel: using link redirect determination to enable apps to directly connect to a final destination to solve the longstanding, deeply felt problem of phishing links. In fact, those trained in the art are taught the opposite of this approach. For example, Mozilla Firefox, Internet Explorer, and Google Chrome browser software applications account for roughly 95% of the Internet browser market. Yet all of them only show their users the initial link (not the final link) when the user is accessing email, chat, text, and more via these browsers. This disclosure's focus on the final destination turns the longstanding traditional approach upside down; hence, its novelty.

One level of security involves displaying the final destination to the user before the user's computer follows the redirect path. The final destination can be displayed as one or more of the URLs belonging to the final destination, and/or the domain name of the final destination, and/or the owner of the final destination, and/or any visual or auditory symbol, alert, cue, or other conveyance that allows the user to know where the URL link redirects ultimately terminate.

This display of the final destination can be made upon loading the message, and/or sometime after loading the message, and/or in response to human interaction (e.g., via mouse click or selection, touch, or any other input well known in the art). For example, the final destination could be displayed to the user upon hovering the mouse cursor over the link. In another example, the link click is intercepted and then the final destination is displayed so that the user can decide whether to actually commit to the click to follow the link or not.

In all cases, an FDDP traces the link path to enable a user process to directly connect to a final destination. For example, the following sequence describes one embodiment of an exemplary system and method for using a user-intended final destination to prevent a phishing attack by a hacker:

(i) The user clicks on a link in a messaging app (such as an email, text, chat, or online social media platform such as Facebook and Twitter).

(ii) The link is intercepted and sent to a server for analysis.

(iii) The server traces the link redirection path.

(iv) The server sends the full path, or part of the path, or just the final destination to the user's computer.

(v) The user's computer displays the full path, or part of the path, or just the final destination.

(vi) The user is given the opportunity to commit to the link or abandon it.

The path can include the initial link, the final destination, and one or more sites between the initial link and the final destination. In some embodiments of the systems and methods herein, a server determines the path and transmits the path to the computing device. An analysis engine of the server may analyze the path to make a path safety determination that the path is safe for the computing device to follow or that path is unsafe for the computing device to follow due to malicious code that may be present on some of the sites in the path.

Knowing the final destination and/or link path offers tremendous security far above the current state of the art. In some instances, the embodiment above may be preferred (e.g., when the second level of security discussed below is impractical if the full link path is needed for functionality).

A second level of security finally solves the problem of phishing links once and for all. With the second layer of security, the user is presented the option of going straight to the final destination, bypassing the entire path of redirects altogether.

It should be noted that going to the final destination could involve going to the last URL in the entire chain, or going to the entry URL of the final domain, or another determination as previously discussed. For example, consider a hypothetical scenario in which a link chain involves several domains with the final domain being example.com, and the final domain enters on www.example.com?user=xyz, and this link redirects to www.example.com?houses=33301, and then this link redirects to example.com?houses=fort_lauderdale. In this example, sending the user's computing device to the final destination could involve sending it to example.com?houses=fort_lauderdale (i.e., the ultimate final URL) or sending the it to www.example.com?user=xyz (i.e., the entry URL of the final domain).

This embodiment finally makes it easy for users to avoid phishing links altogether. With this embodiment, all a user must do is:

(i) Look at the final destination.

(ii) Decide if the final destination is the one the user intends to visit.

(iii) If yes, go straight to the final destination, bypassing all redirect paths.

For example, if an email claims to be from PayPal, the user merely needs to check to make certain that PayPal is the final destination. If PayPal is indeed the final destination, then the user then can proceed with following the link to go directly to that final destination (i.e., PayPal's website). If PayPal is not the final destination as determined by the system, then the user simply does not follow the link.

In other words, this embodiment relies on human-intended final destinations. The user is presented with the final destination and given the opportunity to express whether the final destination is the one the user intended to visit or not. If yes, using an input device, the user can cause the computing device to go straight to the final destination. If the system displays or otherwise indicates that the final destination is not the one the user intended to visit or access, the user can avoid the site altogether by declining to follow the link.

In some embodiments, the system further includes a mismatch reporting process for reporting to a service provider a link or content in which the site does not match the context of the content. By including a mechanism for allowing the user to report any mismatch, the system allows the reported mismatch to be used to warn other users who attempt to access the site, even if such other users do not have access to information regarding the site's owner. Reported mismatches may be transmitted from the computing device via the communications network to a remote computing device that records the reported mismatch as an indication of a potential phishing site, analyzes it for positive identification as a phishing site, or both. Such reported mismatches may be received on the remote computing device by a service provider who maintains such records and performs such analyses for the benefit of other users of the system or for the benefit of third parties.

Various embodiments may be implemented based upon various needs.

Other Embodiments

It is to be understood that while one embodiment of the invention has been described in conjunction with the detailed description thereof, the foregoing description is intended to illustrate and not limit the scope of the invention, which is defined by the scope of the entire specification including the Summary and the appended claims as well. Other aspects, advantages, and modifications are within the scope of the following claims.

What is claimed is:

1. A system for protecting applications and computing devices against malicious URL links, the system comprising:
   a computing device comprising a processor and an associated memory;
   a software application running on the computing device and comprising a link;
   a communications network;
   a final destination determination process; and
   a safetunnel process to safely connect a user process to the final destination;
   wherein the safetunnel process imposes limitations while visiting links in a path following the original URL; and
   wherein the limitations are removed if the final destination is encountered.

2. The system of claim 1, wherein the final destination determination process identifies a final destination.

3. The system of claim 1, wherein the final destination is conveyed to a user by showing a representation of the final destination of the link on a display upon selection of the link.

4. The system of claim 1, wherein a user makes a user selection using a user input device to produce an instruction to connect to the final destination or declines to connect to the final destination based on the final destination shown by the display.

5. The system of claim 4, wherein the computing device allows or disallows a connection to the final destination based on the instruction.

6. The system of claim 1, wherein the final destination is not the original URL of the link.

7. The system of claim 1, wherein the user process is installed on the computing device and connects directly to the final destination if the user selects a connect option.

8. The system of claim 1, wherein the user process bypasses connections to all other remote destinations in a path associated with the link when the user process directly connects to the final destination.

9. The system of claim 1, wherein the computing device provides at least one user-selectable connect option; and wherein upon selection of the at least one user-selectable connect option, the computing device connects directly to the final destination without following a path associated with the link.

10. The system of claim 1, wherein the computing device provides at least one user-selectable connect option; and wherein upon selection of the at least one user-selectable connect option, the computing device connects to at least one site of a path associated with the link, and the computing device disables programmatic capabilities until a connection is made to the final destination.

11. A system for protecting applications and computing devices against malicious URL links, the system comprising:
- a computing device comprising a processor and an associated memory;
- a software application running on the computing device and comprising a link;
- a communications network;
- a final destination determination process; and
- a security service;
- wherein the computing device is communicatively connected to the communications network;
- wherein the final destination determination process identifies a final destination of the link;
- wherein the security service assesses the final destination to make a safety determination;
- wherein if the security service deems the final destination to be safe, a user process is connected to a URL in a path associated with the link other than the original URL of the link.

12. The system of claim 11, wherein the URL to which the user process connects belongs to the final destination.

* * * * *